US008437493B2

(12) United States Patent
Nho et al.

(10) Patent No.: US 8,437,493 B2
(45) Date of Patent: May 7, 2013

(54) APPARATUS FOR MOUNTING A SPEAKER MODULE

(75) Inventors: Kyoung-Min Nho, Yongin-si (KR); Young-Hoon Kim, Suwon-si (KR); Won-Kyung Kim, Seoul (KR); Hyoung-Il Song, Seoul (KR); Chi-Sun Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1071 days.

(21) Appl. No.: 12/182,120

(22) Filed: Jul. 29, 2008

(65) Prior Publication Data

US 2009/0034777 A1    Feb. 5, 2009

(30) Foreign Application Priority Data

Aug. 3, 2007    (KR) .................. 10-2007-0078054

(51) Int. Cl.
*H04R 1/02* (2006.01)
*H04M 1/00* (2006.01)
(52) U.S. Cl.
USPC ........... 381/386; 381/391; 381/395; 381/433; 455/575.1

(58) Field of Classification Search ............... 381/386, 381/390, 391, 395–398, 433, 430, 412; 455/575.1, 455/575.8; 181/198–199
See application file for complete search history.

(56) References Cited

U.S. PATENT DOCUMENTS

| 7,106,878 | B2 * | 9/2006 | Saiki et al. ............... 381/396 |
| 7,181,040 | B2 * | 2/2007 | Ohta ........................ 381/398 |
| 2006/0245155 | A1 * | 11/2006 | Konno et al. ............. 361/683 |
| 2006/0286998 | A1 * | 12/2006 | Fukuda ..................... 455/550.1 |
| 2008/0298627 | A1 * | 12/2008 | Bonebright et al. ...... 381/386 |

* cited by examiner

*Primary Examiner* — Michael Trinh
(74) *Attorney, Agent, or Firm* — Jefferson IP Law, LLP

(57) ABSTRACT

An apparatus for mounting a speaker module to a portable terminal is provided. The speaker module is mounted to a casing frame of the terminal using a coupling part formed outside a housing of the speaker module, so as not to leave a space between the speaker module and the casing frame in a sound output direction of the speaker module. Therefore, better speaker performance can be achieved by raising the height of the speaker module of the slim portable terminal or increasing the space for the back volume.

10 Claims, 4 Drawing Sheets

APPARATUS FOR MOUNTING A SPEAKER MODULE

PRIORITY

This application claims the benefit under 35 U.S.C. § 119 (a) of a Korean patent application filed in the Korean Intellectual Property Office on Aug. 3, 2007 and assigned Serial No. 2007-78054, the entire disclosure of which is hereby incorporated by reference.

BACKGROUND OF THE INVENTION

1. Field of the Invention

The present invention relates to a speaker module of a portable terminal. More particularly, the present invention relates to a structure for mounting a speaker in a casing frame of a portable terminal to carry out the same or further function and to contribute to slimness of the terminal.

2. Description of the Related Art

Recently, advances in various electronic industries have lead to the advent of various portable electronic devices. Among the various portable electronic devices, portable terminals are now ubiquitous.

The portable terminal provides diverse functions in addition to the basic telephone function to satisfy demands of a user. The portable terminal is still under development to accommodate the various additional functions and to reduce the size of the terminal with an emphasis of achieving a slim design.

In the portable terminal, a speaker module is an indispensable part used as a receiver in the telephone service and also as a ringtone speaker and a speakerphone. When the speaker module is mounted in a casing frame of the terminal, efforts are exerted to minimize the amount of space it occupies while carrying out the same or further functions.

Typically, the speaker module operates by an interaction between a magnet fixed in a housing including a receiving part and a diaphragm including a voice coil installed at a certain interval from the magnetic. When a driving signal is applied to the voice coil, the coil moves up or down according to the direction of the magnetic line of the magnet and the magnitude and the direction of the electromagnetic line of the voice coil. At this time, the diaphragm vibrates. That is, as the vibration of the diaphragm is repeated to produce a sound pressure, the speaker module outputs the sound in an Audio Frequency (AF) band.

FIG. 1 illustrates a perspective view of a conventional portable terminal 10. The portable terminal 10 includes a main body 20 having a key pad 21 and a microphone 22, a folder 30 having a liquid crystal display 32 for displaying images and a speaker module (not shown) disposed under a speaker hole 34, and a hinge device 40 for opening and closing the folder 30 from and to the main body 20.

The speaker module is implemented to emit voice and sound out through the speaker hole 34.

However, the speaker mounting structure, which is fixed or supported by the terminal casing frame including the speaker hole, requires the installation space to be as wide as the casing frame is thick. This installation space makes it hard to achieve satisfactory speaker performance and is a limitation on the slimness of the portable terminal.

SUMMARY OF THE INVENTION

An aspect of the present invention is to address at least the above-mentioned problems and/or disadvantages and to provide at least the advantages described below. Accordingly, an aspect of the present invention is to provide a speaker mounting structure of a portable terminal to maintain an existing performance without extending an installation space and to provide an improved speaker module.

Another aspect of the present invention is to provide a speaker mounting structure of a portable terminal to contribute to slimness of the terminal by reducing an installation space.

The above aspects are addressed by providing a structure for mounting a speaker module of a portable terminal according to an aspect of the present invention. The speaker module includes a housing comprising a receiving space and an opening at a top of the housing, a magnet fixed at a bottom of the housing within the receiving space, a diaphragm substantially parallel to the opening and disposed within the receiving space at a distance from the magnet, a voice coil attached to the diaphragm, protruding from the diaphragm toward the magnet and at least partially surrounding the magnet at a distance from the magnet, and a cover comprising a plurality of sound emitting holes, the cover disposed in the opening of the housing for retaining the diaphragm, wherein one side of the cover is exposed when the speaker module is installed in a terminal.

According to another aspect of the present invention, an apparatus for mounting a speaker module to a portable terminal is provided. The apparatus includes a speaker module comprising a housing including an opening, a cover installed in the opening part of the housing through which sound is emitted, and a first coupling part formed on an exterior of the housing, and a front casing frame of the terminal comprising an opening for mounting the speaker module therein and a second coupling part for coupling with the first coupling part, wherein when the speaker module is disposed in the opening of the front casing frame and the first coupling part of the speaker module is coupled to the second coupling part of the front casing frame, there is substantially no space between the speaker module and the front casing frame.

According to yet another aspect of the present invention, a portable terminal comprising a speaker module for producing sound is provided. The terminal includes a speaker module comprising a housing comprising a receiving space, an opening at a top of the housing and a first coupling part formed on an exterior of the housing, a magnet fixed at a bottom of the housing within the receiving space, a diaphragm substantially parallel to the opening and disposed within the receiving space at a distance from the magnet, a voice coil attached to the diaphragm, protruding from the diaphragm toward the magnet and at least partially surrounding the magnet at a distance from the magnet, and a cover comprising a plurality of sound emitting holes, the cover disposed in the opening of the housing for retaining the diaphragm, wherein one side of the cover is exposed when the speaker module is installed in a terminal, and a front casing frame of the terminal comprising an opening for mounting the speaker module therein and a second coupling part for coupling with the first coupling part, wherein when the speaker module is disposed in the opening of the front casing frame and the first coupling part of the speaker module is coupled to the second coupling part of the front casing frame, there is substantially no space between the speaker module and the front casing frame.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

While a speaker module is described as being installed in a portable terminal by way of example, the present invention is not limited to the portable terminal. For instance, exemplary embodiments of the present invention are applicable to any electronic device that can accommodate a speaker module in a casing frame.

Figure 1:
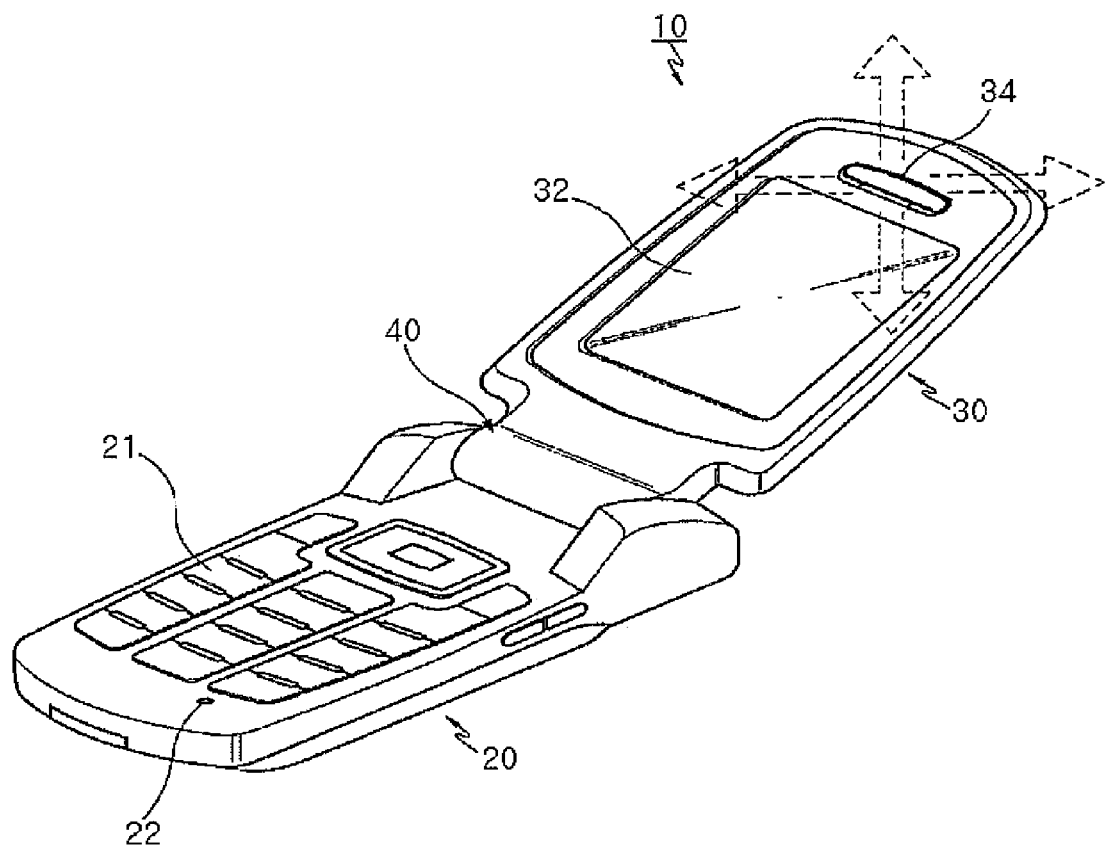
FIG. 1 illustrates a perspective view of a conventional portable terminal.
Figure 2:
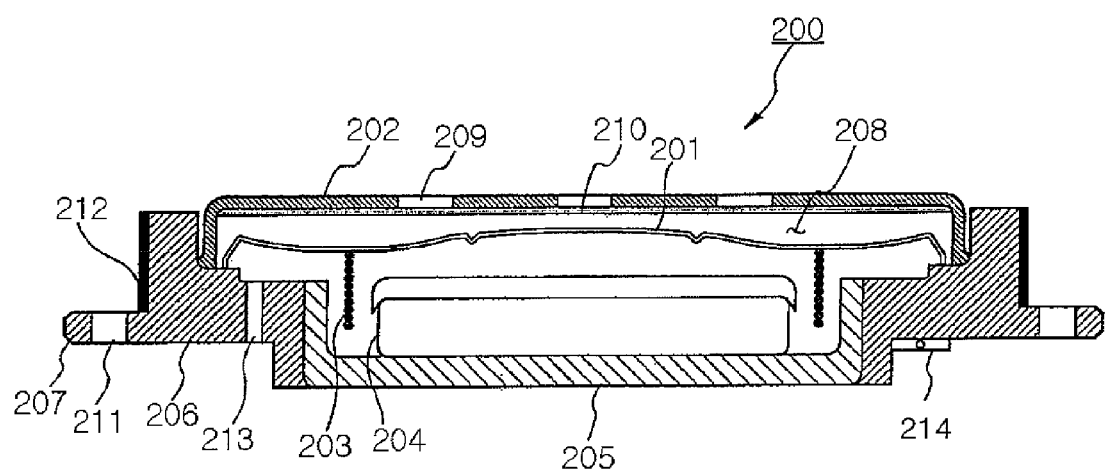
FIG. 2 illustrates a side sectional view of a speaker module according to an exemplary embodiment of the present invention.
Figure 3:
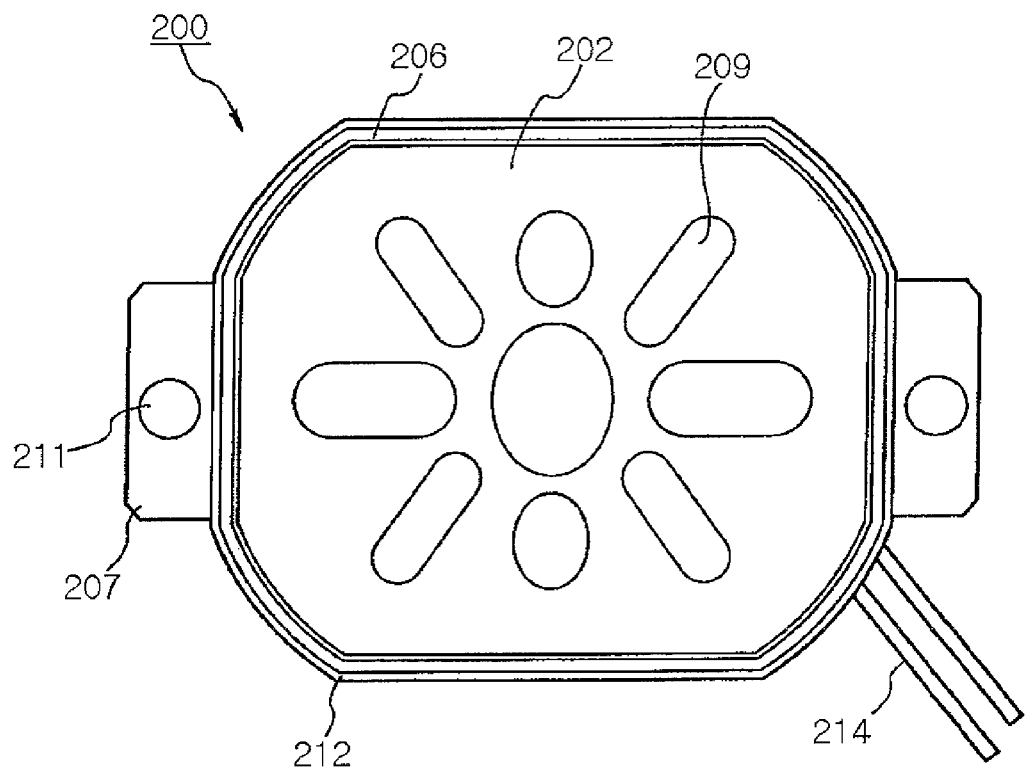
FIG. 3 illustrates a front view of the speaker module according to an exemplary embodiment of the present invention.

FIG. 2 illustrates a side sectional view of a speaker module according to an exemplary embodiment of the present invention, and FIG. 3 illustrates a front view of the speaker module according to an exemplary embodiment of the present invention.

As illustrated in FIGS. 2 and 3, the speaker module 200 includes a housing 206 which includes a receiving space 208 of which the upper part includes an opening with a certain shape, a yoke 205 fixed to a lower part of the housing 206, a magnet 204 fixed on the yoke 205, and a diaphragm 201 installed above the magnet 204 at a certain interval. A voice coil 203 is installed under the diaphragm 201. The voice coil 203 protrudes toward the magnet 204 and winds for multiple times. More specifically, the voice coil 203 surrounds the magnet 204 at a certain interval and vibrates the diaphragm 201 according to an interaction between a magnetic field of the magnet 204 and current applied to the voice coil 203. Thus, the voice coil 203 can produce voice and sound in an Audio Frequency (AF) band.

A plate-type cover 202 is installed in the opening of the housing 206. The cover 202 protects the diaphragm 201 and is exposed to the outside. The cover 202 includes a plurality of sound emitting holes 209 to emit the sound generated by the vibration of the diaphragm 201 to outside. It is advantageous if the cover 202 is formed of a Steel Use Stainless (SUS) material or the like to endure external forces. A screen 210 is installed on the inside of the cover 202, to block any foreign substances from flowing into the housing 206. The screen 210 can utilize conventional non-woven fabrics, conventional sponges, or the like.

The housing 206 may be formed through the injection molding of a synthetic resin or the like. In this exemplary embodiment of the present invention, the yoke 205 is insert-molded. Accordingly, when the magnet 204, the voice coil 203, the diaphragm 201, and the cover 202 are sequentially stacked on the yoke 205, which is fixed to the housing 206 through the insertion molding, the assembly of speaker module 200 is complete.

Preferably, when the speaker module 200 is installed with the terminal, the cover 202 is exposed directly to the outside of the terminal. Thus, there is no need to install a separate bushing for mounting the speaker module 200. Thereby, the casing frame for supporting the front side of the speaker module can be eliminated. Consequently, the mounting space for the speaker module 200 can be ensured and the slimness of the terminal can be realized.

The housing 206 includes a coupling part for fixing to the casing frame of the terminal as illustrates in FIG. 3. For example, the coupling part can use a bracket 207 extended and protruded from either side of the housing 206. The bracket 207 includes a screw through-hole 211 to fix to the casing frame of the portable terminal using a screw.

Instead of the screw in the coupling part, its own shaped structure can be used. For example, the coupling part can be formed as a hook to lock into a groove of the casing frame in a snap-fit structure.

A reference number 213 indicates a rear-side air hole for emitting the sound pressure when the diaphragm 201 vibrates, a reference number 214 indicates a printed circuit for supplying power to the voice coil 203, and a reference number 212 indicates a rubber gasket installed on a contact side of the casing frame for a close contact when the speaker module 200 is mounted to the casing frame of the terminal.

Figure 4:
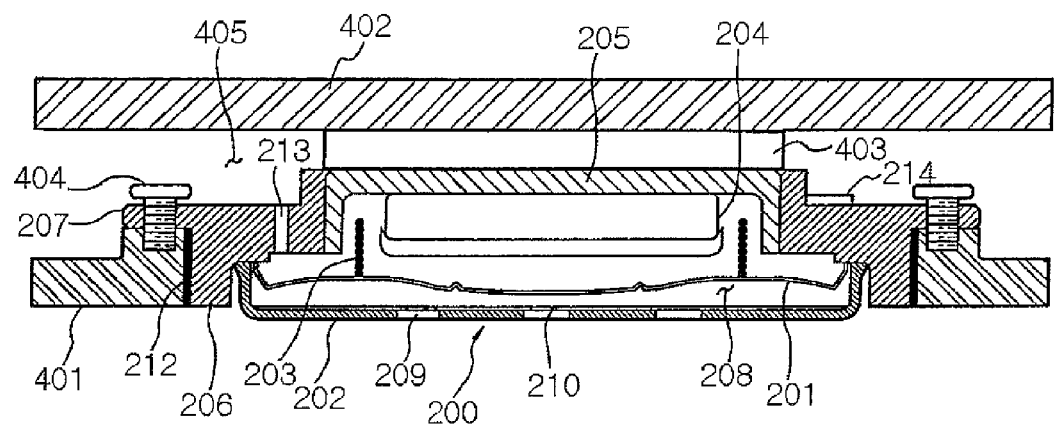
FIG. 4 illustrates a side sectional view of the speaker module mounted in a casing frame of a portable terminal according to an exemplary embodiment of the present invention.

FIG. 4 illustrates a side sectional view of the speaker module mounted in the casing frame of the portable terminal according to an exemplary embodiment of the present invention. The speaker module 200 is mounted in a space 405 between a front casing frame 401 and a rear casing frame 402 of a terminal.

The cover 202 of the speaker module 200 is exposed to the front casing frame 401. The bracket 207 of the housing 206 contacts and couples with the front casing frame 401 using the screw 404. The rubber gasket 212 is interposed between the front casing frame 401 and the side of the housing 206 for the air tightness. The rubber gasket 212 substantially blocks any undesired leak of the sound pressure produced by the speaker and prevents the speaking module 200 from shaking, rattling or vibrating in the assembly process. A damper 403 is interposed between the speaker module 200 and the rear casing frame 402 to securely fix the speaker module 200. It is preferable to form the damper 200 using a rubber material or the like.

By including the speaking mounting space of the terminal casing frame, a sufficient installation space for the speaker module is ensured which contributes to the enhanced performance of the speaker module.

As set forth above, the speaking module mounting structure can achieve better speaker performance by raising the height of the speaker module of the slim portable terminal or by increasing the space of the back volume.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for mounting a speaker module to a portable terminal, the apparatus comprising:
  a speaker module comprising a housing including an opening in an interior of the housing, a cover installed in the opening part of the housing through which sound is emitted, and a first coupling part formed on an exterior of the housing; and
  a front casing frame of the terminal comprising an opening for mounting the speaker module therein and a second coupling part for coupling with the first coupling part, wherein when the speaker module is disposed in the opening of the front casing frame and the first coupling part of the speaker module is coupled to the second coupling part of the front casing frame, there is substantially no space between the speaker module and the opening of the front casing frame such that a substantially soundproof seal is disposed between the speaker module and the front casing frame.

2. The apparatus of claim 1, wherein an outer surface of the cover is exposed when the speaker module is mounted to the front casing frame.

3. The apparatus of claim 2, wherein an outer surface of the front casing frame is positioned at substantially the same height as the outer surface of the cover.

4. The apparatus of claim 1, wherein the first coupling part comprises at least one bracket having a screw through-hole and the second coupling part comprises at least one screw receiving hole, wherein the at least one bracket and the at least one the screw receiving hole are coupled using a screw.

5. The apparatus of claim 1, wherein the first coupling part comprises at least one hook and the second coupling part comprises at least one groove, further wherein the at least one hook and the at least one groove are snap-fit together.

6. The apparatus of claim 1, further comprising a rubber gasket disposed on the exterior of the housing for providing the seal between the speaker module and the front casing frame when the speaker module is mounted to the front casing frame.

7. The apparatus of claim 1, further comprising a rear casing frame of the terminal and a damper, wherein the damper is disposed between the speaker module and the rear casing frame when the speaker module is mounted to the front casing frame.

8. The apparatus of claim 1, further comprising a screen disposed on the cover for blocking a foreign substance from entering the receiving space.

9. The apparatus of claim 8, wherein the screen comprises at least one of a non-woven fabric and a sponge.

10. The apparatus of claim 1, wherein the housing further comprises an air channel from the exterior of the housing to a portion of the receiving space enclosed by the housing and diaphragm.

* * * * *